United States Patent
Takehisa et al.

(10) Patent No.: US 7,099,365 B2
(45) Date of Patent: Aug. 29, 2006

(54) OSCILLATION METHOD AND DEVICE OF FLUORINE MOLECULAR LASER

(75) Inventors: Kiwamu Takehisa, Sendai (JP); Tatsumi Goto, Yamato (JP)

(73) Assignee: Komatsu, Ltd., (JP)

( * ) Notice: Subject to any disclaimer, the term of this patent is extended or adjusted under 35 U.S.C. 154(b) by 290 days.

(21) Appl. No.: 10/281,985

(22) Filed: Oct. 29, 2002

(65) Prior Publication Data

US 2003/0081643 A1 May 1, 2003

(30) Foreign Application Priority Data

Nov. 1, 2001 (JP) .............................. 2001-337205

(51) Int. Cl.
*H01S 3/22* (2006.01)
*H01S 3/223* (2006.01)
*H01S 3/08* (2006.01)

(52) U.S. Cl. ............................. 372/55; 372/61; 372/98
(58) Field of Classification Search ............. 372/55–61
See application file for complete search history.

(56) References Cited

U.S. PATENT DOCUMENTS

| | | | | |
|---|---|---|---|---|
| 4,393,505 A | * | 7/1983 | Fahlen ........................ | 372/57 |
| 5,617,440 A | * | 4/1997 | Meier ......................... | 372/61 |
| 5,901,163 A | * | 5/1999 | Ershov ........................ | 372/20 |
| 6,028,879 A | * | 2/2000 | Ershov ........................ | 372/57 |
| 6,084,893 A | * | 7/2000 | Choi et al. .................... | 372/32 |
| 6,137,821 A | * | 10/2000 | Ershov ....................... | 372/108 |
| 6,249,535 B1 | * | 6/2001 | Hayashikawa et al. ........ | 372/62 |
| 6,330,260 B1 | * | 12/2001 | Onkels et al. ............. | 372/38.04 |
| 6,331,995 B1 | * | 12/2001 | Hayashikawa et al. ..... | 372/107 |
| 6,337,869 B1 | * | 1/2002 | Yamashita et al. ............ | 372/30 |
| 6,389,048 B1 | | 5/2002 | Stamm et al. | |
| 6,404,795 B1 | | 6/2002 | Leinhos et al. | |
| 6,414,978 B1 | * | 7/2002 | Bragin et al. ................. | 372/58 |
| 6,456,643 B1 | * | 9/2002 | Osmanow et al. ............ | 372/86 |
| 6,580,742 B1 | * | 6/2003 | Hayashikawa et al. ....... | 372/58 |
| 6,618,422 B1 | * | 9/2003 | Bragin et al. ................. | 372/86 |
| 6,643,312 B1 | * | 11/2003 | Kakizaki et al. .............. | 372/57 |
| 6,650,679 B1 | * | 11/2003 | Bragin et al. ................. | 372/87 |
| 6,667,804 B1 | * | 12/2003 | Kleinschmidt .............. | 356/326 |

(Continued)

FOREIGN PATENT DOCUMENTS

JP          1-192183          8/1989

(Continued)

OTHER PUBLICATIONS

An Empirical Approximation to the Voigt Profile, E.E. Whiting: J. Quant, Spectrosc. Radiat, Transfer, vol. 8, pp. 1379-1384.

*Primary Examiner*—Minsun Oh Harvey
*Assistant Examiner*—Phillip Nguyen
(74) *Attorney, Agent, or Firm*—Rader, Fishman & Grauer PLLC

(57) ABSTRACT

An oscillation method and a device of fluorine molecular laser with narrow spectral line width are provided. For this purpose, the device includes main electrodes (14, 15) for performing main discharge (50) in substantially a same direction as an optical axis of laser light (11) to be oscillated to excite a laser gas containing fluorine, an insulator (12) which is held between the main electrodes and into which the laser gas containing fluorine is injected, and resonators (16, 18) which are placed with the insulator between them, and a space ($M(\lambda)$) of a vertical mode expressed in wavelength is made larger than full width at half maximum ($\Delta\lambda$) of a gain curve (R) of the laser gas.

9 Claims, 9 Drawing Sheets

U.S. PATENT DOCUMENTS 6,754,247 B1 * 6/2004 Kakizaki et al. .............. 372/57
2002/0186741 A1 * 12/2002 Kleinschmidt et al. ....... 372/57

FOREIGN PATENT DOCUMENTS

| | | |
|---|---|---|
| JP | 2000-216471 | 8/2000 |
| JP | 2000-236125 | 8/2000 |
| JP | 2000-236130 | 8/2000 |
| JP | 2000-357836 | 12/2000 |
| JP | 2001-24265 | 1/2001 |
| WO | WO 00/60708 | 10/2000 |

* cited by examiner

F I G. 1 0
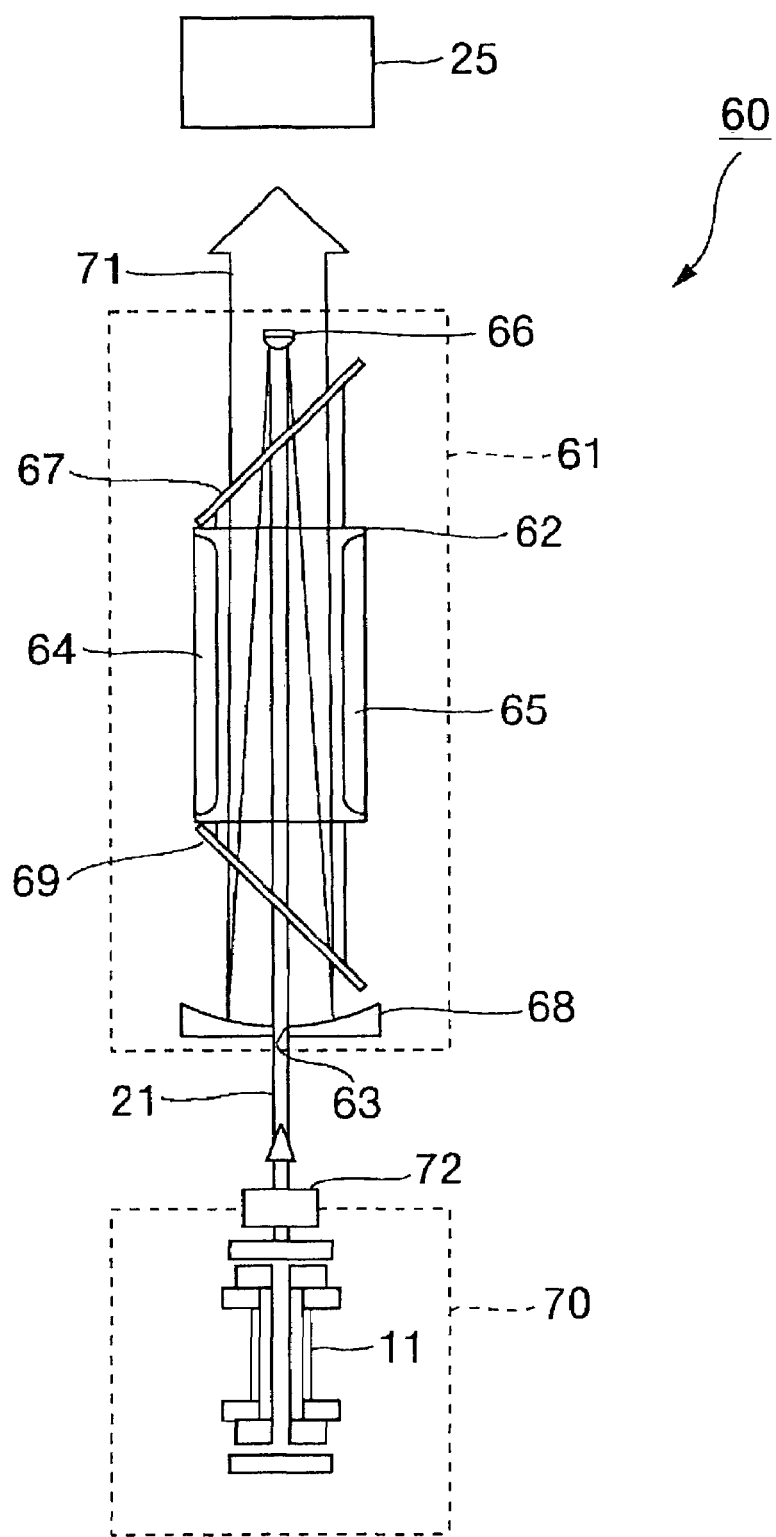

F I G. 1 1
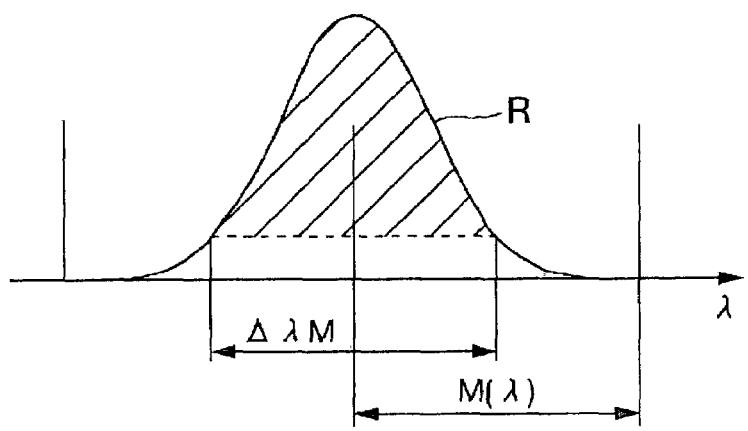
F I G. 1 2 Prior Art
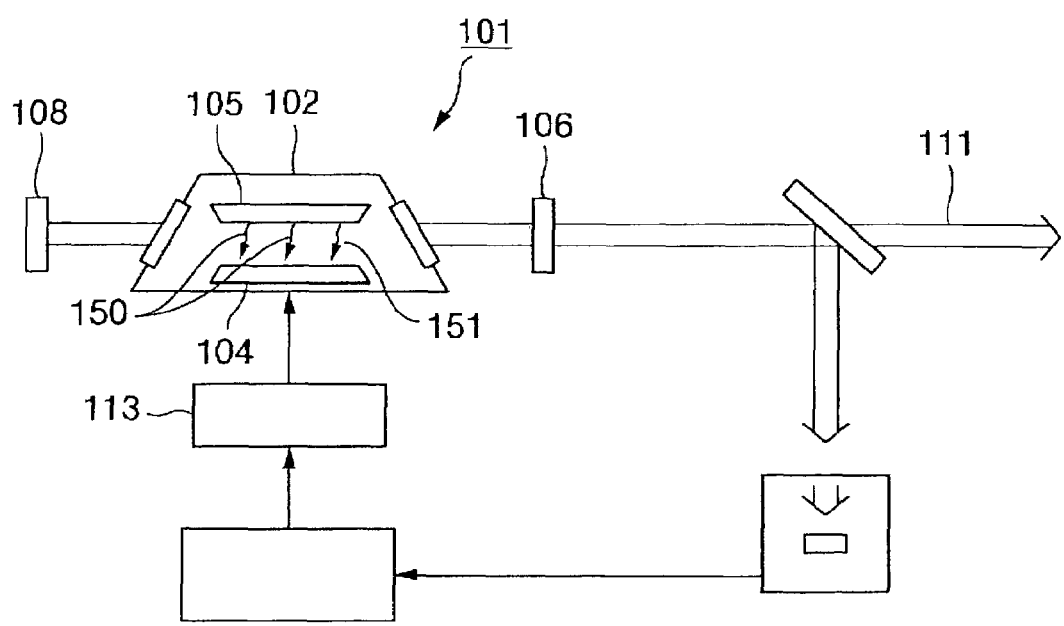

F I G. 1 3  Prior Art
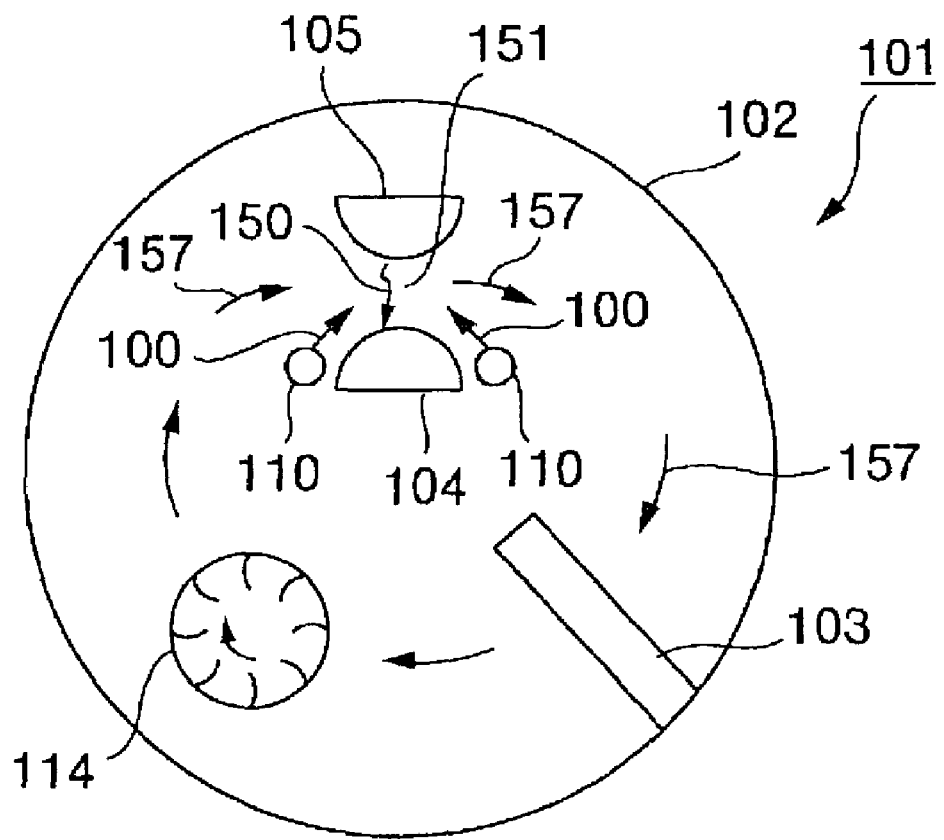

OSCILLATION METHOD AND DEVICE OF FLUORINE MOLECULAR LASER

TECHNICAL FIELD

The present invention relates to an oscillation method and a device of fluorine molecular laser.

BACKGROUND ART

Fluorine molecular laser devices are conventionally known, and, for example, Japanese Patent Laid-open No. 2000-216471 discloses one. FIG. 12 shows a fluorine molecular laser device 101 disclosed in the same Laid-opened Patent, and FIG. 13 shows a constitution of the fluorine molecular laser device 101 seen from a side, which is not disclosed in the same Laid-opened Patent. In FIG. 12 and FIG. 13, the fluorine molecular laser device 101 includes a laser chamber 102 in which a laser gas containing fluorine is sealed, and a pair of main electrodes 104 and 105 for exciting the laser gas by main discharge 150. A one-through fan 114 for leading a flow of the laser gas shown by the arrow 157 to an area between the main electrodes 104 and 105 and a heat exchanger 103 for cooling the laser gas are placed at predetermined positions in the laser chamber 102.

The main electrodes 104 and 105 are placed to oppose each other with the laser gas between them, and cause the main discharge 150 to a discharge space 151 by applying a high-voltage current from a high-voltage power supply 113 to excite the laser gas. A front mirror 106 and a rear mirror 108 are respectively placed in front of and at the rear of the laser chamber 102, and laser light 111 is oscillated in a rightward direction in FIG. 12, which is perpendicular to the main discharge 150. The method for causing the main discharge 150 perpendicularly to an optical axis of the laser light 111 with the main electrodes 104 and 105 being opposed to each other with the laser gas between them as described above is called a lateral excitation type.

As shown in FIG. 13, in the fluorine molecular laser device 101, preionization discharge is performed by preionization electrodes 110 as in an excimer laser device, whereby ultraviolet rays 100 are caused to perform preionization for the discharge space 151. As a result, the laser gas is ionized before the main discharge 150 occurs, and thereby the main discharge 150 is favorably performed. As a result, the laser light 111 with a wavelength of about 157 nm is emitted from the fluorine molecular laser device 101, and is used as a light source for an aligner for lithography, for example, or the like.

However, the prior art disclosed in the aforementioned Japanese Patent Laid-open No. 2000-216471 has the problem described below.

Namely, when the fluorine molecular laser device 101 is used as the light source of an aligner, it is necessary to narrow a spectral line width of the wavelength of the laser light 111 (this is called band-narrowing), and decrease chromatic aberration caused by an optical system of the aligner to improve resolution of exposure. In the conventional fluorine molecular laser device 101, the pressure of the laser gas is about 0.3 MPa to 0.4 MPa (about 3 atmospheres to 4 atmospheres). At such high pressure, pressure broadening in the spectral line width is increased, and the spectral line width of the laser light 111 in a state in which band-narrowing is not performed becomes as wide as about 1 pm. As a result, there arises the problem of reducing resolution of exposure.

SUMMARY OF THE INVENTION

The present invention is made in view of the above-described problem, and has its object to provide an oscillation method and a device of fluorine molecular laser with narrow spectral line width.

In order to attain the above-described object, the oscillation method of fluorine molecular laser according to the present invention is in an oscillation method of fluorine molecular laser for exciting a laser gas containing fluorine to oscillate laser light, when oscillating the laser light, a space of a vertical mode expressed in wavelength is made larger than full width at half maximum of a gain curve of the laser gas.

According to the above method, only one vertical mode exists in the gain half-value width, and therefore single vertical mode oscillation in which only one vertical mode is oscillated is made possible, thus obtaining laser light with very narrow spectral line width.

A first aspect of the fluorine molecular laser device according to the present invention has a constitution including main electrodes for performing main discharge in substantially a same direction as an optical axis of laser light to be oscillated to excite a laser as containing fluorine, an insulator which is held between the main electrodes and into which the laser gas containing fluorine is injected, and resonators which are placed with the insulator between them, in which a space of a vertical mode expressed in wavelength is made larger than full width at half maximum of a gain curve of the laser gas.

A second aspect of the fluorine molecular laser device according to the present invention has a constitution including main electrodes for performing main discharge in substantially a same direction as an optical axis of laser light to be oscillated to excite a laser gas containing fluorine, an insulator which is held between the main electrodes and into which the laser gas containing fluorine is injected, and resonators which are placed with the insulator between them, in which resonator length L satisfies a mathematical expression:

$$L \leq (\lambda(P,T))^2 / \{\Delta\lambda_L(P) + [\Delta(\lambda_L(P))^2 + 4\Delta\lambda_G(T)^2]^{1/2}\}$$

in relationship with pressure P of the laser gas, temperature T of the laser gas, full width at half maximum $\Delta\lambda(P, T)$ of a gain curve, wavelength width $\Delta\lambda_L(P)$ by Lorents distribution having pressure dependence, and wavelength width $\lambda_G(T)$ by Gaussian distribution having temperature dependence.

According to the above first and second constitutions, the single vertical mode oscillation is realized.

Further, in the fluorine molecular laser device, the insulator may be a hollow discharge tube into which the laser gas is injected, and the main electrodes may be placed at both end portions of the discharge tube. According to the constitution, it is possible to oscillate the laser light with the laser gas at low pressure. As a result, the gain width becomes narrow, and therefore even if the resonator length is long, single vertical mode oscillation becomes possible.

Further, in the fluorine molecular laser device, the insulator may include a preionization electrode comprising an electric conductor on a surface opposite to a surface with which the laser gas to be excited is in contact. According to the constitution, the laser gas is ionized, and main discharge is easily stabilized.

Furthermore, in the fluorine molecular laser device, the insulator may be in a plate shape having an optical path hole, an inside of which the laser light passes through, and the main electrodes may be placed at both end portions of the optical path hole. According to the constitution, the insulator in the plate shape prevents external discharge from occurring between the main electrodes outside the optical path hole. Accordingly, an insulating plate or the like for preventing external discharge is not needed, which makes it possible to reduce the resonator length.

Further, the device may be an injection locking type fluorine molecular laser device, including the fluorine molecular laser device of the above-described constitution, and an amplifier for amplifying seed light, with laser light oscillated from the fluorine molecular laser device as the seed light. According to the constitution, the above-described fluorine molecular laser device has a very narrow spectral line width, and therefore, by amplifying the laser light by the amplifier, the amplified laser light with large output energy can be obtained while keeping the spectral line width narrow.

Furthermore, in an aligner for performing exposure by laser light, the fluorine molecular laser device of the above-described constitution which is used as a light source or the injection locking type fluorine molecular laser device of the above-described constitution may be included. According to the constitution, by making the laser light or the amplified laser light, which is emitted from the above-described fluorine molecular laser device or the injection locking type fluorine molecular laser device in which this is amplified, the light source of the aligner, exposure with high resolution is made possible.

BRIEF DESCRIPTION OF THE DRAWINGS

FIG. 10 is a block diagram of an injection locking type laser device according to a fourth embodiment of the present invention;

FIG. 11 is a diagram for explaining relationship between a gain curve and a vertical mode according to the present invention;

FIG. 12 is an explanatory view showing a constitution of a fluorine molecular laser device according to a prior art; and FIG. 13 is an explanatory view showing a constitution of the fluorine molecular laser device according to the prior art seen from a side.

BEST MODE FOR CARRYING OUT THE INVENTION

Figure 1:
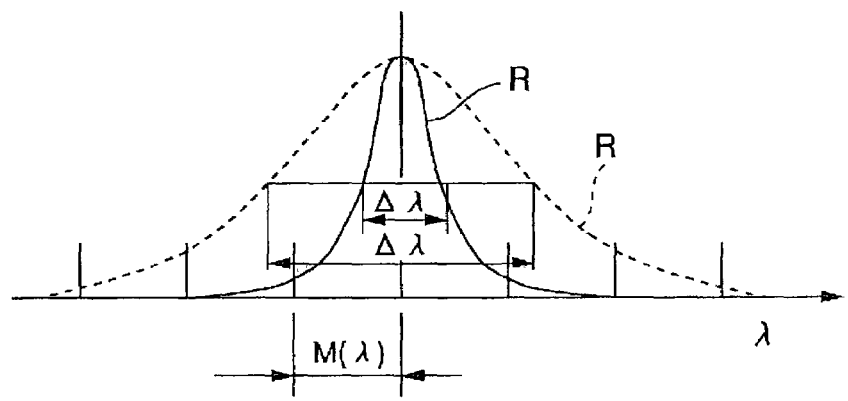
FIG. 1 is a diagram for explaining relationship between a gain curve and a vertical mode in the present invention.

Preferred embodiments of the present invention will be explained in detail below with reference to the drawings.

Firstly, broadening of gain based on pressure and temperature in a gas laser device will be explained. It is well-known that in the laser device, the relationship as in the following mathematical expression 1.1 exists between resonator length L and a vertical mode space M(v) of laser light expressed in frequency.

$$M(v) = C/2L \qquad (1.1)$$

Here, C represents speed of light.

The relationship as in mathematical expression 1.2 exists between frequency v and the vertical mode space M (v) expressed in frequency, and wavelength λ and the vertical mode space M(λ) expressed in wavelength.

$$M(\lambda)/\lambda \sim M(v)/v \qquad (1.2)$$

"~" in each of the above-described and the following mathematical expressions means "substantially equals".

Accordingly, the vertical mode M(λ) expressed in the wavelength is expressed by the following mathematical expression 1.3.

$$M(\lambda) \sim \lambda \cdot C/(2v \cdot L) \qquad (1.3)$$

Since v=C/λ the following mathematical expression 1.4 holds.

$$M(\lambda) \sim \lambda^2/(2L) \qquad (1.4)$$

On the other hand, it is known that in the gas laser device, the relationship as shown in the following mathematical expression 2.1 exists between pressure P and temperature T of the laser gas, and full width at half maximum Δλ(P, T) of a gain curve R [hereinafter, this is called gain half-value width Δλ(P, T)] from the document of J. Quant. Spectrosc. Radiat. Transfer. Vol.8. 1968. pp. 1379–1384 (E. E. WHITING: AN EMPIRICAL APPROXIMATION TO THE VOIGT PROFILE).

$$\Delta\lambda(P, T) \sim [\Delta\lambda_L(P)/2] + [\Delta\lambda_L(P)^2/4 + \Delta\lambda_G(T)^2]^{1/2} \qquad (2.1)$$

Here, $\Delta\lambda_L(P)$ is wavelength width by Lorents distribution having pressure dependence, and $\lambda_G(T)$ is wavelength width by Gaussian distribution having temperature dependence.

In mathematical equation 2.1, the relationships in the following mathematical equations 2.2 to 2.4 exist as to the wavelength width $\Delta\lambda_L(P)$ by the Lorents distribution and the wavelength width $\Delta\lambda_G(T)$ by the Gaussian distribution.

$$\Delta\lambda_L(P) \sim P/3 \qquad (2.2)$$

$$\Delta\lambda_G(T) \sim \lambda_0 \cdot \Delta\nu(T)/\nu_0 \qquad (2.3)$$

$$\Delta\nu(T) = 2\nu_0 \cdot [2kT \cdot \ln 2/(M \cdot C^2)]^{1/2} \qquad (2.4)$$

Here, $\nu_O$ is frequency corresponding to a time when oscillation is performed with certain wavelength $\lambda_0$.

Mathematical expression 2.2 is a relational expression that is empirically proven with the unit of $\Delta\lambda_L(P)$ as pm and the unit of P as atmosphere, and mathematical expression 2.3 is an equation made by converting the frequency broadening into wavelength broadening. Mathematical expression 2.4 expresses Doppler broadening of wavelength in the gas laser device. In the mathematical expression 2.4, k represents a Boltzmann's constant ($=1.38 \times 10^{-23}$), and M represents a mass of a fluorine molecular ($=0.038/(6.02 \times 10^{23})$).

It is known that the spectral line width is extremely narrowed when only one of the vertical modes of the laser light is oscillated (single vertical mode oscillation). In order to oscillate the laser light with the single vertical mode, it is suitable to make only one vertical mode exist in the gain half-value width $\alpha\lambda(P, T)$. The relationship between the gain curve R and the vertical mode is shown in FIG. 1. When the gain half-value width $\Delta\lambda(P, T)$ is larger than a space M ($\lambda$) of the vertical mode as the gain curve R shown by the broken line in FIG. 1, a plurality of vertical modes are oscillated. As a result, the spectral line width is broadened, and when this laser light is used for exposure, resolution is reduced.

On the other hand, in order to oscillate with the single vertical mode, as the gain curve R shown by the solid line, it is suitable to make the gain half value width $\Delta\lambda(P, T)$ narrower than the vertical mode space $M(\lambda)$. For this purpose, it is necessary that $\Delta\lambda(P, T) > M(\lambda)$. Namely, it is necessary that the following mathematical expression 3.1 holds from the mathematical expression 1.4 and the mathematical expression 2.1.

$$\lambda^2/(2L) \geq \Delta\lambda_L(P)/2 + ([\Delta\lambda_L(P)^2/4 + \Delta\lambda_G(T)^2])^{1/2} \qquad (3.1)$$

Organizing the mathematical expression 3.1, when the resonator length L satisfies the following mathematical expression 3.2, the gain half-value width $\Delta\lambda(P, T)$ becomes narrower than the vertical mode space. As a result, only one vertical mode is oscillated, and the laser light with a very narrow spectral line width can be obtained.

$$L \leq \lambda(P, T)^2 / \{\Delta\lambda_L(P) + ([\Delta\lambda_L(P)^2 + 4 \cdot \Delta\lambda_G(T)^2]^{1/2}\} \qquad (3.2)$$

Figure 2:
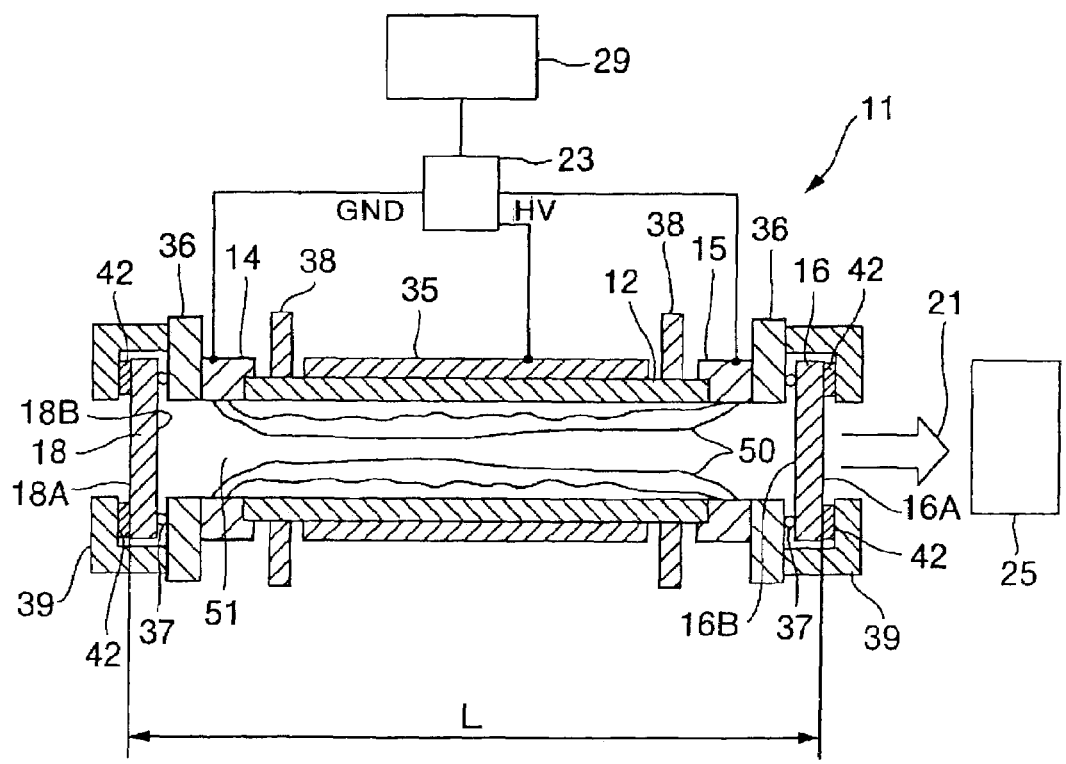
FIG. 2 is a sectional view showing a constitution of a fluorine molecular laser device according to a first embodiment of the present invention.

A first embodiment will be explained hereinafter. FIG. 2 is a sectional view showing a constitution of a fluorine molecular laser device 11 according to the first embodiment.

In FIG. 2, the fluorine molecular laser device 11 includes a discharge tube 12 in which a laser gas prepared by diluting fluorine ($F_2$) with a buffer gas to about 0.1% is sealed at pressure of 0.04 MPa (0.4 atmospheres). As the buffer gas, helium (He), neon (Ne), or the mixture gas of them is used. In the following explanation, the word seal expresses not only the case in which the laser gas is trapped only inside the discharge tube 12, but also the case in which the laser gas is held inside of other components including an outside pipeline and the like that will be described later.

The discharge tube 12 is in a hollow cylindrical shape, and is constituted by a material including both corrosion resistance and insulation properties against fluorine, such as ceramic such as alumina, and sapphire, for example. Sapphire is more excellent in hermeticity than, for example, silica glass and the like. It is desirable that ceramic is pore-free, having no pores on its surface. In the explanation below, a longitudinal direction of the discharge tube 12 (the lateral direction in FIG. 2) is called an optical direction.

Figure 3:
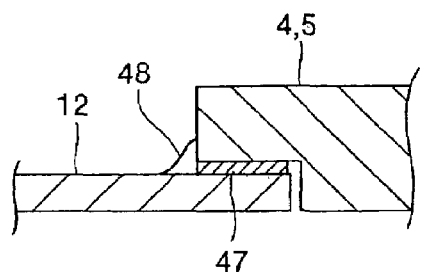
FIG. 3 is a detailed diagram of a joint portion of main electrodes and a discharge tube according to the present invention.

Main electrodes 14 and 15 constituted by the ring-shaped anode 14 and cathode 15 are attached to both end portions of the discharge tube 12. The anode 14 and the cathode 15 are constituted by, for example, nickel alloy, and they are connected to a ground contact (GND) side and a high pressure (HV) side of a high-voltage power supply 23 which applies high voltage in a pulse form via a main discharge circuit (not shown). A joint portion of the main electrodes 14 and 15 and the discharge tube 12 is shown in FIG. 3. As shown in FIG. 3, thin films 47 and 47 of, for example, nickel, or the like are fixed to an outer circumference in the vicinity of both end portions of the discharge tube 12 by means of vacuum deposition or the like. The process of depositing the thin metal films 47 and 47 on the surface of non-metal will be called metallizing, hereinafter. The main electrodes 14 and 15 are fitted onto outer circumferences of the metallized thin films 47 and 47, and spaces between the thin films 47 and 47, and the main electrodes 14 and 15 are blazed with blazing fillers 48 and 48 of gold or copper, whereby the main electrodes 14 and 15 are fixed and laser gas is sealed.

In FIG. 2, a preionization electrode 35 constituted by, for example, copper is fixed to the outer circumference of the discharge electrode 12 between the main electrodes 14 and 15 by metallizing. The preionization electrode 35 is connected to the high pressure side HV of the high pressure power supply 23 via a preionization circuit (not shown). Disc-shaped insulation plates 38 and 38 of the same material as, for example, the discharge tube 12 are fitted onto the outer circumference part of the discharge tube 12 at both end portions. The insulation plates 38 and 38 prevent external discharge from occurring between the main electrodes 14 and 15 outside the discharge tube 12.

Ring-shaped resonator support members 36 and 36 are attached to both outer sides of the main electrodes 14 and 15 in the optical axis direction by brazing. A rear mirror 18 for totally reflecting fluorine molecular laser light 21 (hereinafter, called the laser light 21), and a front mirror 16 for reflecting part of the laser light 21 and emitting the other part thereof are pressed from outside by bolts (not shown) and holding members 39 and 39 via resin sheets 42 and 42 such as TEFLON (trade name) or the like to be fixed at both outer sides in the optical axis direction of the resonator support members 36 and 36. The front mirror 16 and the rear mirror 18 are generally called the resonators 16 and 18, hereinafter. Spaces between the resonators 16 and 18, and the resonator support members 36 and 36 are sealed by means of metal seals 37 and 37.

The front mirror 16 and the rear mirror 18 are made of calcium fluoride ($CaF_2$). Antireflection (AR) coating not shown is applied on an outside (the right side in FIG. 2) surface 16A, which is not in contact with the laser gas, of the front mirror 16. Coating is not applied on an inside surface 16B, which is in contact with the laser gas, of the front mirror 16. Total reflection coating not shown is applied on an outside (the left side in FIG. 2) surface 18A, which is not in contact with the laser gas, of the rear mirror 18. Coating is not applied on an inside surface 18B, which is in contact with the laser gas, of the rear mirror 18.

The resonator length L in the first embodiment means a distance L between the outside surface 16A, on which the antireflection coating is applied, of the front mirror 16, and the outside surface 18A, on which the total reflection coating is applied, of the rear mirror 18. In the first embodiment, the resonator length L is 3 cm.

When laser oscillation is carried out, a laser controller 29 outputs an instruction to the high-voltage power supply 23, and applies high-voltage in a pulse form to the preionization electrode 35. As a result, glow discharge (not shown) called preionization discharge occurs in a discharge space 51 inside the discharge tube 12, then the laser gas in the discharge space 51 is ionized, and free electrons are supplied into the discharge space 51. This is called preionization discharge. The laser controller 29 applies high voltage in a pulse form to an area between the main electrodes 14 and 15 from the high-voltage power supply 23 immediately after the preionization discharge. The pulse width of the high voltage at this time is 100 ns or less. Thus, main discharge 50 is carried out between the anode 14 then the cathode 15, the laser gas in the discharge space 51 is exited, and the laser light 21 with the wavelength λ of about 157 nm is oscillated. The emitted laser light 21 is incident on an aligner 25 and used for exposure.

As explained above, according to the first embodiment, the discharge tube 12 constituted by an insulator is held between the main electrodes 14 and 15, and the main discharge 50 is caused in the optical direction, whereby the laser gas mixed with fluorine is excited, and the laser light 21 is oscillated. Such an excitation method is called an axial excitation method.

According to the axial excitation method, the main discharge 50 at this time is considered to be Surface Discharge occurring mainly by being transmitted along the inner wall of the discharge tube 12. Accordingly, impedance between the main electrodes 14 and 15 is determined by a density of the laser gas existing between the main electrodes 14 and 15. Therefore, dielectric voltage between the main electrodes 14 and 15 becomes low, and as compared with the lateral excitation method, discharge is started in a state in which the pressure of the laser gas is low, and is stabilized. As a result, as compared with a conventional lateral excitation type of fluorine molecular laser device 101 which excites a high-pressure laser gas, the condition to satisfy the mathematical expression 3.2 is very loose.

Figure 4:
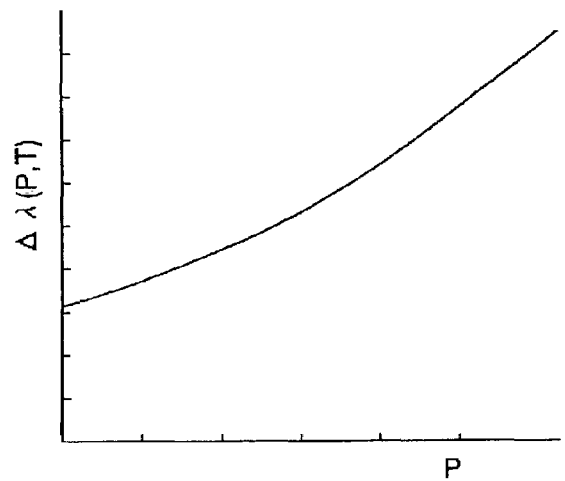
FIG. 4 is a diagram showing relationship between gas pressure and gain half-value width according to the first embodiment.
Figure 5:
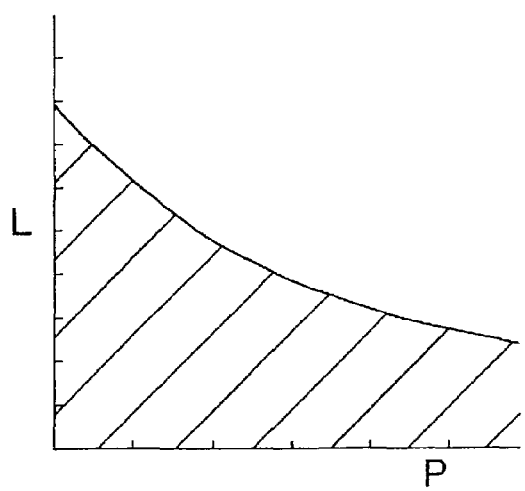
FIG. 5 is a diagram showing relationship between resonator length and gas pressure according to the first embodiment.

The relationship between gas pressure P and gain half-value width $\Delta\lambda(P, T)$ is shown in the graph in FIG. 4. As shown in FIG. 4, as the gas pressure is lower, the gain half-value width $\Delta\lambda(P, T)$ becomes narrower. Accordingly, by performing laser oscillation at low gas pressure, it is possible to make only one vertical mode enter the gain half-value width $\Delta\lambda(P, T)$ even if the resonator length is long to some extent. In FIG. 5, the relationship between the resonator length L and the gas pressure P, which satisfies the mathematical expression 3.2, is shown in the graph. In FIG. 5, the area shown by the oblique lines is the area which satisfies the mathematical expression 3.2. As shown in FIG. 5, as the gas pressure P is lower, the resonator length L can be made longer, and production of the fluorine molecular laser device 11 is facilitated.

For example, in the fluorine molecular laser device 11 according to the first embodiment, the pressure P of the laser gas is about 0.04 MPa (0.4 atmospheres), and thus the gain half-value width $\Delta\lambda(P, T)$ is about 0.39 pm from the mathematical expression 2.1. On the other hand, in the first embodiment, the resonator length L is 3 cm, the vertical mode space $M(\lambda)$ is 0.41 pm from the mathematical expression 1.4, and it becomes wider than the gain half-value width $\Delta\lambda(P, T)$ of 0.39 pm. Accordingly, only one vertical mode is oscillated, and it is possible to obtain the laser light 21 with very narrow spectral line width.

On the other hand, in, for example, a lateral excitation type of fluorine molecular laser device 101, the main discharge 50 is not favorably performed if the pressure P of the laser gas is not higher, and it is necessary to make the pressure P about 0.3 MPa (three atmospheres) or more. The gain half-value width $\Delta\lambda(P, T)$ in this case is about 1 pm from the mathematical expression 2.1. However, in order to obtain the vertical mode space $M(\lambda)$ that is wider than 1 pm, it is necessary to make, for example, the resonator length L 1.24 cm or less, which makes production of the fluorine molecular laser device 101 very difficult.

Though it is described that the preionization electrode 35 is fixed to the outer circumference of the discharge tube 12 by metallization, this is not restrictive, and it may be suitable to form it by winding, for example, a thin copper film around the outer circumference of the discharge tube 12. However, as explained above, according to metallilzation, the preionization electrode 35 can be brought into close contact with the outer circumference of the discharge tube 12 without a clearance, and therefore it is possible to perform more uniform and stronger preionization.

Figure 6:
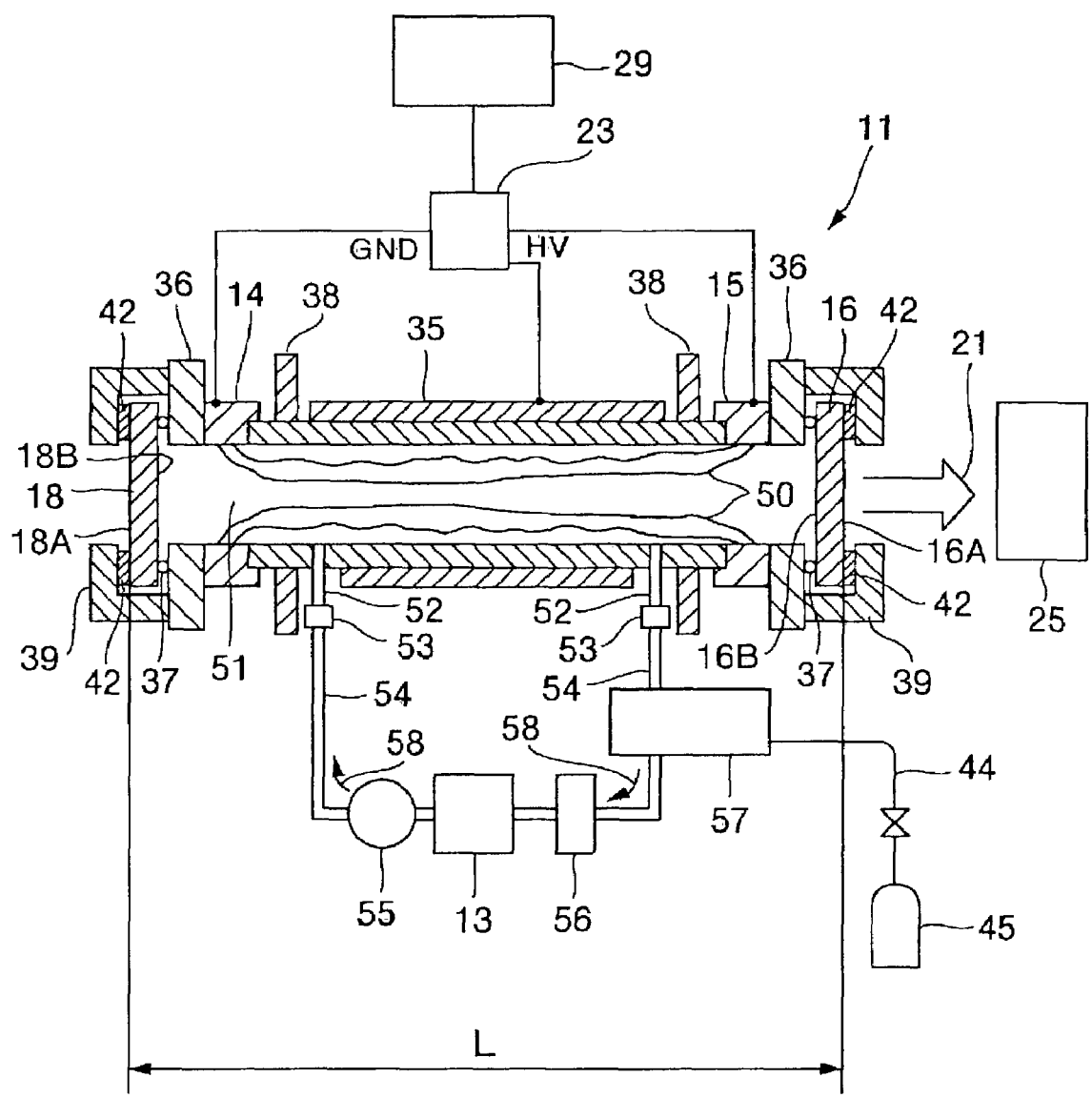
FIG. 6 is a block diagram of a fluorine molecular laser device according to a second embodiment of the present invention.

Next, a second embodiment will be explained. FIG. 6 is a block diagram of the fluorine molecular laser device 11 according to the second embodiment. In FIG. 6, projections 52 and 52 are provided at the outer circumference part at both ends of the discharge tube 12, and openings not shown are provided at tip ends of the projections 52 and 52 so that an inside and an outside of the discharge tube 12 are connected via the projections 52 and 52. Outer circumferences of the projections 52 and 52 are metallized, and gas joints 53 and 53 are blazed at the metallized portions. A gas circulation line 54 is connected to the gas joints 53 and 53.

To the gas circulation line 54, connected are a circulation pump 55 for driving the laser gas, a filter 56 for removing impurities such as dust mixed into the laser gas, a heat exchanger 13 for removing heat occurring in the laser gas by discharge, and a gas chamber 57 for storing the laser gas. A laser gas cylinder 45 is connected to the gas chamber 57 via a laser gas line 44 so that the laser gas can be supplied as necessary.

When the fluorine molecular laser device 11 is operated, the laser gas is passed in the direction of, for example, the arrow 58 by driving a pump to always replace the laser gas inside the discharge tube 12 with fresh laser gas. Then, high-voltage in a pulse form is applied to the preionization electrode 35 from the high-voltage power supply 23. As a result, glow discharge (not shown) called preionization discharge occurs in the discharge space 51 inside the discharge tube 12, the laser gas in the discharge space 51 is ionized, and free electrons are supplied into the discharge space 51. This is called preionization.

High voltage in a pulse form is applied to an area between the main electrodes 14 and 15 from the high-voltage power supply 23 immediately after the preionization discharge. The pulse width of the high voltage at this time is 100 ns or less. Thereby, the main discharge 50 is carried out between the anode 14 and the cathode 15, and the laser gas in the discharge space 51 is excited to oscillate the laser light 21. The emitted laser light 21 is incident on the aligner 25 and used for exposure.

As explained above, according to the second embodiment, the laser gas is circulated. As a result, even if impurities occur inside the discharge tube 12, these impurities can be removed. Even if the laser gas inside the discharge tube 12 is deteriorated by discharge and fluorine is decreased, it is supplemented by the laser gas cylinder 45. Accordingly, it is always possible to cause the main discharge 50 to the fresh laser gas and oscillate the laser light 21, and therefore reduction in pulse energy of the laser light 21 hardly occurs. By making the gas pressure P about 0.04 MPa (0.4 atmospheres) and resonator length L 3 cm at this time, single vertical mode oscillation is possible as in the first embodiment.

Figure 7:
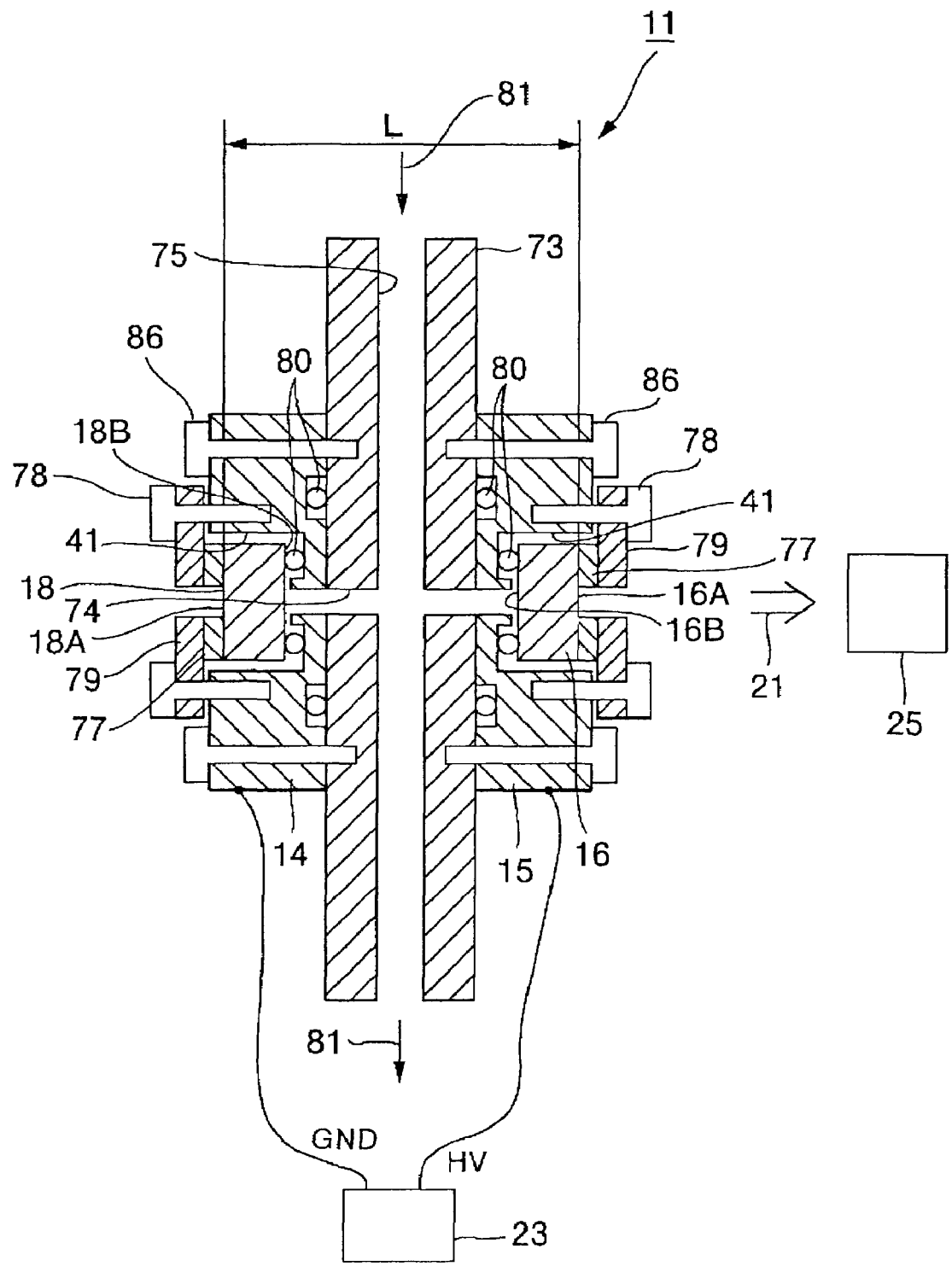
FIG. 7 is a block diagram of a fluorine molecular laser device according to a third embodiment of the present invention.
Figure 8:
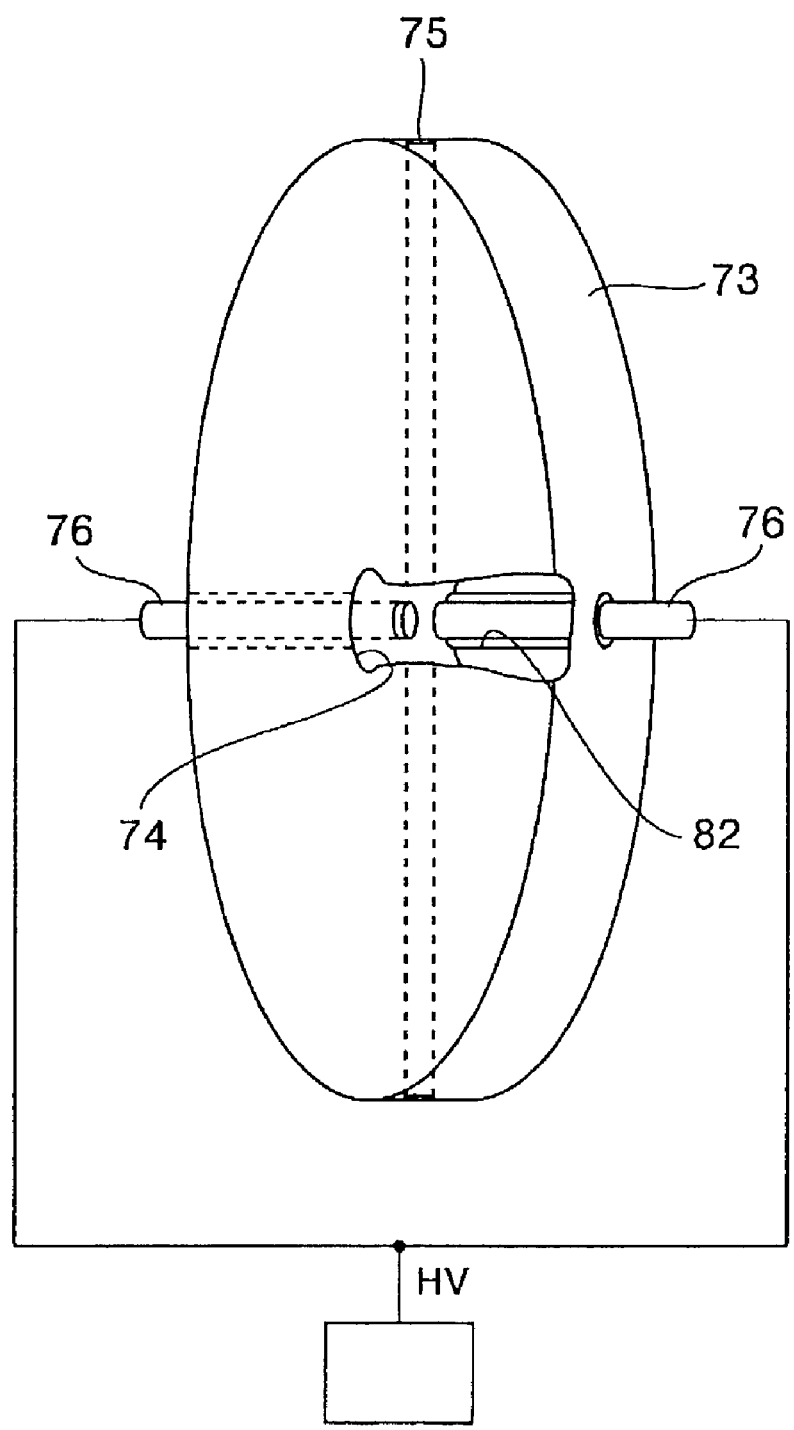
FIG. 8 is a perspective view of a disc in the fluorine molecular laser device in FIG. 7.

Next, a third embodiment will be explained. In FIG. 7, a sectional block diagram of the fluorine molecular laser device 11 according to the third embodiment will be shown. In FIG. 7, the fluorine molecular laser device 11 includes a disc 73 with an insulation property, which is made of the same material as the discharge tube 12. In FIG. 8, a perspective view of the disc 73 is shown. As shown in FIG. 7 and FIG. 8, at substantially a center part in a diameter direction of the disc 73, an optical path hole 74 of about 1 mm in diameter for passing the laser light 21 penetrates in a thickness direction (the lateral direction in FIG. 7). At substantially a center part in a thickness direction on an end surface of the disc 73, a laser gas hole 75 for passing the laser gas penetrates in a diameter direction (the top and bottom direction in FIG. 7). From one end portion of the laser gas hole 75, the laser gas is fed therein via a pipeline (not shown) and escapes to the other end portion as shown by the arrows 81.

The disc 73 is provided with preionization holes 82 and 82 to be substantially orthogonal to the laser gas hole 75 and the optical path hole 74, and rod-shaped preionization pins 76 and 76 are inserted therein. The preionization pins 76 and 76 are connected to an HV side of the high-voltage power supply 23. In FIG. 8, illustration of a GND side of the high-voltage power supply 23 is omitted. The main electrodes 14 and 15 constituted by the anode 14 and the cathode 15 are fixed to both outer sides in a longitudinal direction of the light path hole 74 of the disc 73 from outside by means of screws 86 and 86. The anode 14 and the cathode 15 are connected to the GND side and the HV side of the high-voltage power supply 23, respectively. Spaces between the main electrodes 14 and 15 and the disc 73 are sealed with O-rings 80 and 80.

The anode 14 and the cathode 15 are provided with recessed portions 41 and 41, respectively, and the rear mirror 18 and the front mirror 16 are placed inside the recessed portions 41 and 41, respectively. The rear mirror 18 and the front mirror 16 are held by being pressed by the main electrodes by means of bolts 78 and 78 and holding members 79 and 79 via resin sheets 77 and 77 such as TEFLON (trade name of Dupont). Spaces between the rear mirror 18 and the front mirror 16, and the main electrodes 14 and 15 are sealed with the O-rings 80 and 80.

Antireflection (AR) coating (not shown) is applied on the outside (the right side in FIG. 7) surface 16 A, which is not in contact with the laser gas, of the front mirror 16. On the other hand, coating is not applied on the inside surface 16B, which is in contact with the laser gas. Total reflection coating (not shown) is applied on the outside (the left side in FIG. 7) surface 18A, which is not in contact with the laser gas, of the rear mirror 18. On the other hand, coating is not applied on the inside surface 18B, which is in contact with the laser gas. When the laser light 21 is oscillated, high voltage is applied to the preionization pins 76 and 76 at first, and after the laser gas inside the light path hole 74 is ionized, the high voltage is applied to an area between the main electrodes 14 and 15 to excite the laser gas, as in the first and second embodiments.

As shown in FIG. 7, the resonator length L in the third embodiment is expressed as the distance between the outside surface 16A on which the antireflection coating is applied and the outside surface 18A on which the total reflection coating is applied, and is about 2 cm. Accordingly, from the mathematical expression 1.4, the vertical mode space M ($\lambda$) is about 0.62 pm. On the other hand, if the laser gas is supplied so that the gas pressure P inside the optical path hole 74 is, for example, 0.1 MPa (one atmosphere), the gain half-value width $\Delta\lambda$(P, T) is about 0.5 pm from the mathematical expression 2.1. As a result, the vertical mode space M ($\lambda$) is wider than the gain half-value width $\Delta\lambda$(P, T), and therefore single vertical mode oscillation becomes possible. The emitted laser light 21 is incident on the aligner 25 and used for exposure.

As explained above, according to the third embodiment, the disc 73 serves as the discharge tube 12 in the first and the second embodiments, and as the insulation plate 38 for preventing the external discharge between the main electrodes 14 and 15 outside the disc 73. As a result, the insulation plate 38 is not needed, and therefore it becomes possible to reduce the distance between the main electrodes 14 and 15, thus making it possible to reduce the resonator length L more. As a result that the resonator length L becomes shorter, the vertical mode space M($\lambda$) becomes larger, and therefore the gain half-value width $\Delta\lambda$(P, T) can be also made larger, whereby single vertical mode oscillation occurs even if the gas pressure P of the laser gas is made higher. As a result that the gas pressure P is increased, the gain is increased, and output of the laser light 21 is increased.

Figure 9:
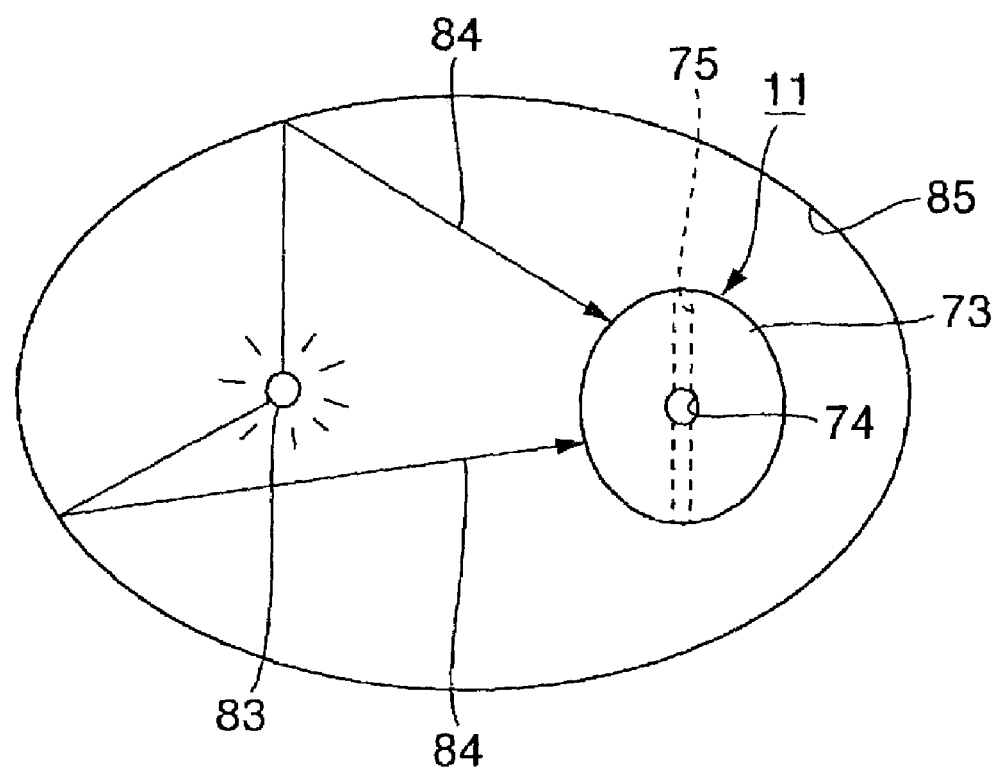
FIG. 9 is an explanatory view of an example in which the fluorine molecular laser device according to the third embodiment is preionized by an ultraviolet lump.

FIG. 9 shows another example in which the fluorine molecular laser device 11 according to the third embodiment is preionized by an ultraviolet lamp 83 instead of being preionized by the preionization pins 76. In FIG. 9, the disc 73 has the constitution in which the preionization hole 82 and the preionization pins 76 are omitted from what is shown in FIG. 7 and FIG. 8. The fluorine molecular laser device 11 is placed at one focal point of an ellipsoidal reflecting mirror 85 with its inner wall being a mirror reflecting ultraviolet rays. The ultraviolet lamp 83 is placed at the other focal point of the reflecting mirror 85. The disc 73 is made of a material such as calcium fluoride ($CaF_2$) and magnesium fluoride ($MgF_2$) which are transparent to ultraviolet rays.

When the ultraviolet lamp 83 is lit, an ultraviolet ray 84 emitted from the ultraviolet lamp 83 passes through the disc 73 of the fluorine molecular laser device 11 and is concentrated on the light path hole 74. As a result, the inside of the light path hole 74 is preionized, and the main discharge 50 is caused, whereby it is possible to oscillate the laser light (not shown).

In the third embodiment, the disc 73 is not limited to a disc shape, but it may be suitable if only it is in a plate shape. Namely, it may be suitable if it performs the function of preventing external discharge between the main electrodes 14 and 15 at the outside, and it may be, for example, in a rectangular plate shape, or an elliptical disc shape.

Next, a fourth embodiment will be explained. FIG. 10 shows a constitution of an injection locking (injection lock) type fluorine molecular laser device 60 using the fluorine molecular laser device 11 shown in any one of the first to the third embodiments as a seed laser device. In FIG. 10, the fluorine molecular laser device shown in FIG. 2 is used as the fluorine molecular laser device 11. As shown in FIG. 10, the injection locking type fluorine molecular laser device 60 includes the fluorine molecular laser device 11 for oscillating the laser light 21, and an amplifier 61 using the laser light 21 as seed light and amplifying it. The fluorine molecular laser device 11 is placed inside a thermostatic bath 70, and the temperature thereof is controlled to be about a predetermined temperature ±0.1. As a result, it is made possible to always oscillate only one oscillated vertical mode with a predetermined center wavelength with stability.

The laser light 21 is emitted from a window 72 provided at the thermostatic bath 70. The amplifier 61 has an amplifying chamber 62 in which the laser gas is sealed, amplifying windows 67 and 69 provided at both end portions of the amplifying chamber 62 to form a Brewster angle with respect to an optical axis, a concave mirror 68 with a hole provided at a rear part in the optical axis direction of the amplifying chamber 62 and having an introduction hole 63 substantially in a center, and a convex mirror 66 provided at a front part of the amplifying chamber 62. Inside the amplifying chamber 62, amplifying electrodes 64 and 65 are placed at predetermined positions so as to oppose each other, so that high voltage can be applied from a high-voltage power supply (not shown). A fan (not shown) is placed inside the amplifying chamber 62 to circulate the laser gas inside the amplifying chamber 62 and lead it to an area between the amplifying electrodes 64 and 65.

In FIG. 10, the laser light 21 oscillated from the fluorine molecular laser device 11 is transmitted through the amplifying window 69 from the introduction hole 63 of the concave mirror 68 with the hole to be incident on the amplifier 61. Subsequently, it is reflected several times between the convex mirror 66 and the concave mirror 68 with the hole, transmitted through the amplifying window 67 at the front part, and is taken out from an area around the convex mirror 66 as amplified laser light 71 with a donut-shaped section. In this situation, inside the amplifying chamber 62, high voltage is applied to an area between the amplifying electrodes 64 and 65 from the high-voltage power supply (not shown) by being timed to the oscillation of the laser light 21, whereby amplifying discharge (not shown) occurs. By the amplifying discharge, the laser light 21 has its pulse output amplified, keeping the wavelength and spectral line width while passing through the inside of the amplifying chamber 62, and is emitted from the amplifier 61 as the amplified laser light 71. The emitted amplified laser light 71 is incident on the aligner 25 and used for exposure.

As explained above, according to the fourth embodiment, the axial excitation type of fluorine molecular laser device 11 is use as the seed laser device, and the laser light 21 oscillated from the fluorine molecular laser device 11 is amplified in the amplifier 61. As explained in the first to fourth embodiments, the laser light 21 of the single vertical mode with very narrow spectral line width is emitted from the axial excitation type of fluorine molecular laser device 11. Since the laser light 21 is amplified as the seed light, the amplified laser light 71 which similarly has very narrow spectral line width with large output energy can be obtained. By making such injection locking type fluorine molecular laser device 60 a light source of the aligner 25, very fine machining with very high resolution is made possible.

It is described in FIG. 10 that the fluorine molecular laser device 11 and the amplifier 61 are aligned in series, but this is not restrictive. For example, the fluorine molecular laser device 11 and the amplifier 61 may be aligned in parallel, and the laser light 21 may be reflected in a U-shape by a reflection mirror not shown or the like to be incident on the amplifier 61.

By doing as above, the injection locking type of fluorine molecular laser device 60 has a compact constitution.

In each of the above-described embodiments, it is described that the resonators 16 and 18 are placed outside the main electrodes 14 and 15, but this is not restrictive, and at least any one of the resonators 16 and 18 may be placed at the inner side of the main electrode 14 or 15. In each of the above-described embodiments, it is described that oscillation is made with a single vertical mode by making the vertical mode space $M(\lambda)$ wider than the gain half-value width $\Delta\lambda(P, T)$, but also in this case, oscillation with other very weak vertical modes are sometimes made. Accordingly, as shown in, for example, FIG. 11, if the vertical mode space $M(\lambda)$ is made wider than the gain width $\Delta\lambda M$ which the area of the gain curve R is 95% or more, more reliable single vertical mode oscillation is made possible.

What is claimed is:

1. A fluorine molecular laser device, comprising:
   main electrodes for performing main discharge in substantially a same direction as an optical axis of laser light to be oscillated to excite a laser gas containing fluorine;
   an insulator between said main electrodes and into which the laser gas containing fluorine is injected; and
   mirrors, said insulator being between said mirrors,
   wherein a resonator length L satisfies a mathematical expression:
   $L \leq \lambda(P, T)^2 / \{\Delta\lambda_L(P) + [\Delta\lambda_L(P)^2 + 4\Delta\lambda_G(T)^2]^{1/2}\}$ in relationship with pressure P of the laser gas, temperature T of the laser gas, full width at half maximum $\Delta\lambda(P, T)$ of a gain curve, wavelength width $\Delta\lambda_L(P)$ by Lorents distribution having pressure dependence, and wavelength width $\lambda_G(T)$ by Gaussian distribution having temperature dependence.

2. The fluorine molecular laser device according to claim 1,
   wherein said insulator comprises a hollow discharge tube into which the laser gas is injected, and
   wherein said main electrodes are placed at both end portions of said discharge tube.

3. The fluorine molecular laser device according to claim 1,
   wherein said insulator includes a preionization electrode comprising an electric conductor on a surface opposite to a surface with which the laser gas to be excited is in contact.

4. The fluorine molecular laser device according to claim 2,
   wherein said insulator includes a preionization electrode comprising an electric conductor on a surface opposite to a surface with which the laser gas to be excited is in contact.

5. The fluorine molecular laser device according to claim 1,
   wherein said insulator is in a plate shape having an optical path hole an inside of which the laser light passes through, and
   wherein said main electrodes are placed at both end portions of said optical path hole.

6. An injection locking type fluorine molecular laser device, comprising:
   the fluorine molecular laser device according to any one of claim 1 to claim 5; and an amplifier for amplifying seed light, with laser light oscillated from the fluorine molecular laser device as the seed light.

7. An aligner for performing exposure by laser light, comprising:
the fluorine molecular laser device according to any one of claim 1 to claim 5, which is used as a light source.

8. An aligner for performing exposure by laser light, comprising:
the injection locking type fluorine molecular laser device according to claim 6, which is used as a light source.

9. The fluorine molecular laser device according to any one of claim 1 to claim 5, wherein said resonator length L is the distance between the outside surface of a first of said mirrors on which an antireflection coating is applied and the outside surface a second of said mirrors on which the total reflection coating is applied.

* * * * *